US011589126B2

(12) United States Patent
Montgomery et al.

(10) Patent No.: US 11,589,126 B2
(45) Date of Patent: Feb. 21, 2023

(54) TELEVISION RECEIVER WAGER STAGING

(71) Applicant: DISH Network L.L.C., Englewood, CO (US)

(72) Inventors: Jesse Montgomery, Denver, CO (US); Christopher Bennett, Denver, CO (US); Shaun Ryan, Colorado Springs, CO (US); Kumar Kothari, Denver, CO (US); James Wilde, Denver, CO (US); Christopher Kuhrt, Englewood, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 17/448,797

(22) Filed: Sep. 24, 2021

(65) Prior Publication Data
US 2022/0103905 A1    Mar. 31, 2022

Related U.S. Application Data

(60) Provisional application No. 63/083,221, filed on Sep. 25, 2020.

(51) Int. Cl.
| | |
|---|---|
| *G06F 3/00* | (2006.01) |
| *G06F 13/00* | (2006.01) |
| *H04N 5/445* | (2011.01) |
| *H04N 21/478* | (2011.01) |
| *H04N 21/2187* | (2011.01) |

(Continued)

(52) U.S. Cl.
CPC ..... *H04N 21/4781* (2013.01); *G07F 17/3288* (2013.01); *H04N 21/2187* (2013.01); *H04N 21/4126* (2013.01); *H04N 21/4383* (2013.01); *H04N 21/8133* (2013.01); *H04N 21/858* (2013.01); *G06Q 50/34* (2013.01); *G07F 17/323* (2013.01)

(58) Field of Classification Search
CPC ........... H04N 21/4781; H04N 21/2187; H04N 21/4126; H04N 21/4383; H04N 21/858; G07F 17/3288; G06Q 50/34
See application file for complete search history.

(56) References Cited

U.S. PATENT DOCUMENTS

| | | | |
|---|---|---|---|
| 10,861,289 B1 * | 12/2020 | Gordon | G07F 17/3225 |
| 2015/0379816 A1 * | 12/2015 | Hayon | G07F 17/3244 463/25 |

(Continued)

FOREIGN PATENT DOCUMENTS

WO    WO-2014185867 A1 * 11/2014 ......... G06Q 30/0601

*Primary Examiner* — Gigi L Dubasky
(74) *Attorney, Agent, or Firm* — Kilpatrick Townsend & Stockton, LLP

(57) ABSTRACT

A television receiver may present live television programming along with a sports gaming interface that indicates various betting options that are selectable by a television viewer via a remote control. The television receiver may receive a selection of a betting option presented in the sports gaming interface. A request may then be sent to a mobile device of the television viewer. The television receiver may in response to the selection, transmit a bet identifier of the selected betting option and an account identifier to the television service provider system. After a user has funded the bet and completed the transaction via a mobile device, the sports gaming interface may indicate the active bet.

18 Claims, 10 Drawing Sheets

(51) Int. Cl.
*H04N 21/81* (2011.01)
*H04N 21/41* (2011.01)
*H04N 21/438* (2011.01)
*G07F 17/32* (2006.01)
*H04N 21/858* (2011.01)
*G06Q 50/34* (2012.01)

(56) References Cited

U.S. PATENT DOCUMENTS

2021/0001236 A1* 1/2021 Srinivasan ............ G07F 17/326
2021/0136456 A1* 5/2021 Srinivasan ............ H04L 63/083
2022/0051528 A1* 2/2022 Carlson ............... G07F 17/3223

* cited by examiner

TELEVISION RECEIVER WAGER STAGING

CROSS REFERENCES TO RELATED APPLICATIONS

This Application claims priority to U.S. Provisional Patent Application No. 63/083,221, filed on Sep. 25, 2020, entitled "Television Receiver Wager Staging." The entire disclosure of which is hereby incorporated by reference for all purposes.

BACKGROUND

Many jurisdictions allow residents to legally bet on sporting events. Bettors typically make and monitor their bets through a dedicated gaming application or website. Such an arrangement may be cumbersome to bettors who want to watch the sporting event while monitoring their bets.

SUMMARY

Various arrangements for integrating sports gaming with live television are presented. Such arrangements can include methods, systems, non-transitory processor-readable mediums and devices. In some embodiments, a television receiver receives live television programming from a television service provider system. The receiver may output the live television programming received from the television service provider system for presentation, such as to a television. While outputting the live television programming, the television receiver may generate and output a sports gaming interface to be presented concurrently with the live television programming for presentation. The sports gaming interface can indicate wagering options that are each selectable by a television viewer via a remote control of the television receiver. A selection of a first wager may be received from the wagering options presented in the sports gaming interface and a request to send to a mobile device of the television viewer. In response to the selection, the television receiver may transmit a wager identifier of the first selected wager and an account identifier to the television service provider system. The wager identifier and the account identifier may be transmitted to a sports gaming server system that is distinct from the television service provider system.

Embodiments of such arrangements may include one or more of the following features: In response to receiving the selected wager identifier and the account identifier, the sports gaming server system may create a link to a staged wagering transaction based on the first selected wager. The link may be transmitted to the staged wagering transaction to the mobile device of the television viewer. A mobile device may access the staged wagering transaction using the link. The mobile device may initiate the staged wagering transaction. Accessing the staged wagering transaction may include an application installed on the mobile device being launched in response to the link being accessed. In response to initiating the staged wagering transaction, an electronic wager slip may be generated for the staged wagering transaction. Information corresponding to the electronic wager slip mapped to the account identifier may be transmitted from the sports gaming server system to the television service provider system. In response to receiving the information corresponding to the electronic wager slip, the information corresponding to the electronic wager slip may be transmitted by the television service provider system to the television receiver. The television receiver may cause to be presented within the sports gaming interface, the information corresponding to the electronic wager slip, wherein the sports gaming interface indicates that the staged wagering transaction has been completed. The television receiver may output, as part of the sports gaming interface, a graphical score element corresponding to a sporting event in progress that is not being presented as the live television programming. The graphical score element can include a channel change element. The television receiver can receive a selection of the channel change element. While presenting the sports gaming interface, the television channel may be changed to output live television programming corresponding to the sporting event in response to the selection of the channel change element. The live television programming may be transmitted to the television receiver by the television service provider via a satellite and the wager identifier may be transmitted to the television service provider via the Internet and/or the satellite. A selection of a second wager of the wagering options presented in the sports gaming interface may be received via a remote control. The request to send to the mobile device of the television viewer can occur while both the first selected wager and the second selected wager are selected.

DETAILED DESCRIPTION

Figure 1:
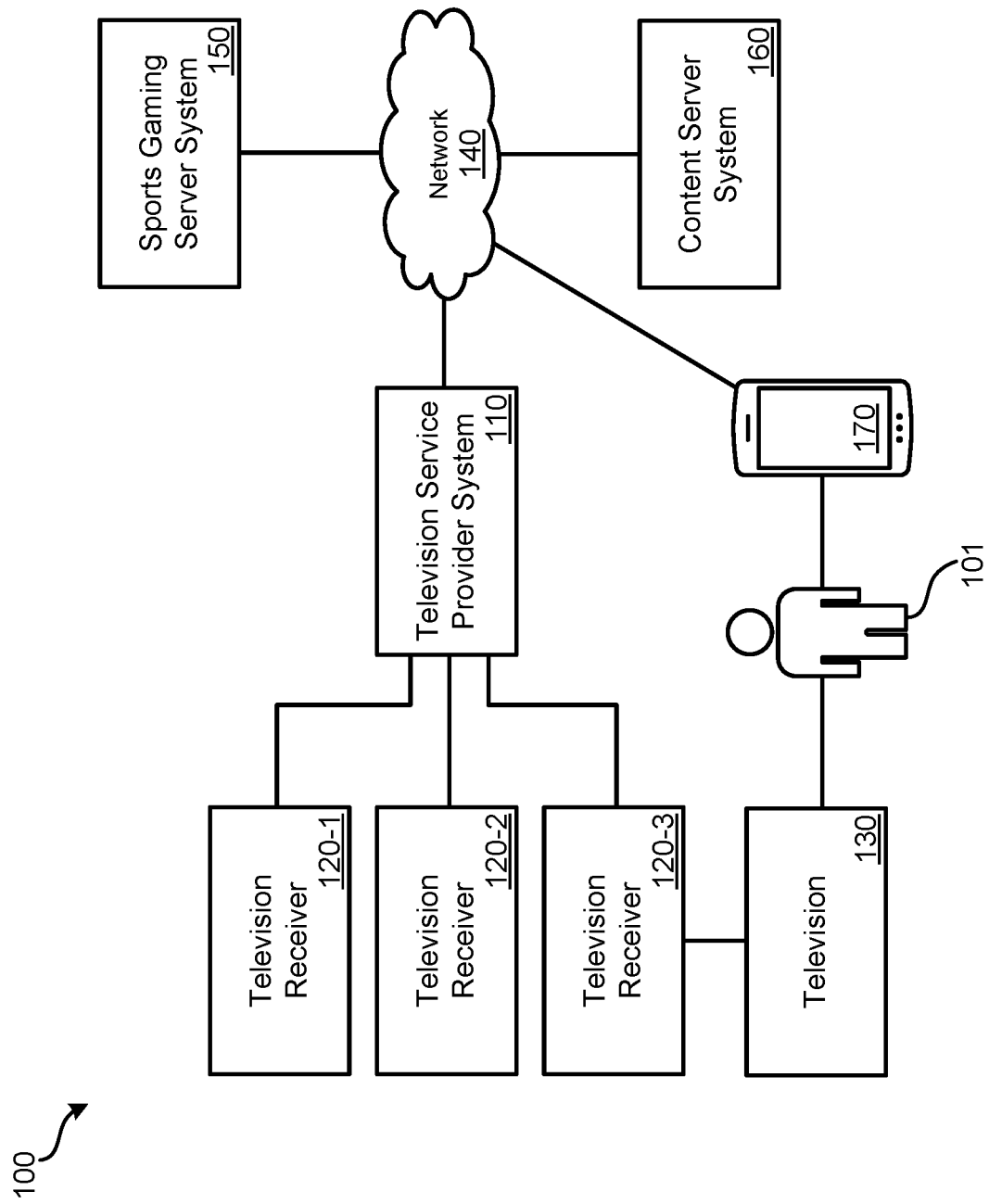
FIG. 1 illustrates an embodiment of an integrated television sports wagering system.

Historically, bettors that wanted to bet on a sporting event travelled to a location where sports betting was legalized. For example, in the United States, bettors could travel to Las Vegas, Nev. to visit a sportsbook, also known as a sports betting facility, in person. At a sportsbook, the bettor could place various bets and/or wagers on various aspects of sporting events and watch the sporting event live, typically on television. Now that more states have legalized sports betting, many bettors can place bets from any location using dedicated applications installed on a computerized device or via a web browser. To watch the corresponding sporting event, the bettor may use his home television and television subscription.

Integration between the bettor's television viewing experience and the placing of bets may be efficient and useful to the bettor. For instance, rather than looking between two separate devices, embodiments detailed herein can allow the bettor to focus his vision almost exclusively on the television for both information about bets and for watching the sporting events live.

Embodiments detailed herein are directed to television receiver-presented sports gaming interfaces. Such sports gaming interfaces can allow a television viewer to review potential bets that can be placed. The sports gaming interface may allow a user to stage a bet, such as by selecting the particular aspect of a game that the television viewer desires to bet on. The television viewer may then send a staged bet to his mobile device. On the mobile device, the television viewer can complete the wager or bet, such as by funding the amount that the television viewer desires to wager. Once the bet has been funded, the sports gaming interface presented by the television receiver may be updated to indicate that the bet has been completed.

In some embodiments, the sports gaming interface is adjusted based on the specific jurisdiction in which the television receiver is installed. For example, a television receiver installed in a jurisdiction that permits legal sports betting may allow a user to stage monetary bets. A television receiver installed in a jurisdiction that does not permit sports betting may allow the television viewer to participate in various sports fantasy competitions or contests. Embodiments detailed herein that are directed to sports gaming can refer to both legal sports betting and fantasy sports competitions and contests. Further, embodiments herein are applicable to both bets (which is a contract to exchange funds based on an outcome of an event) and wagers (in which the bettor deposits money with a party when gambling on an event). Therefore, even when only a bet or wager is referred to with this document, embodiments can be applied to both wagers and bets. In other embodiments, the sports gaming interface is consistent for all users across jurisdictions, but if sports gambling is illegal, at some point in the process, the television viewer may be blocked from completing a wager.

FIG. 1 illustrates an embodiment of an integrated television sports wagering system 100 ("system 100"). System 100 can include: television service provider system 110; television receivers 120 (120-1, 120-2, 120-3); television 130; network 140; sports gaming server system 150; content server system 160; and mobile device 170. Person 101 can be referred to as a "television viewer" or "bettor."

Television service provider system 110 may broadcast live television programming to television receivers 120. "Live" television programming refers to television programming that is transmitted substantially contemporaneously with the event occurring. Live television programming may include a delay of up to several minutes. For instance, a sporting event that is broadcast with a delay of up to a few minutes, such as to edit out offensive audio, would qualify as live television programming. Such live television programming may be received from various content providers, then relayed by television service provider system 110 to television receivers 120. Streams of many television channels may be broadcast live via various types of television programming distribution networks, such as a satellite-based network, cable-based network, IP-based network, or over-the-top (OTT) television distribution network, which may operate using an Internet connection. In addition to streaming live television channels, television service provider system 110 may transmit on-demand content to television receivers 120, applications for execution, electronic programming guide (EPG) data, metadata, and other services ancillary to live television programming. Further detail regarding a possible embodiment of television service provider system 110 is provided in relation to FIG. 2.

While three television receivers 120 are presented, this number of television receivers is merely for illustration—many more television receivers may receive live television programming from television service provider system 110 in other embodiments. A television receiver, such as television receiver 120-3, may be integrated as part of a television or other form of display device or may be a separate device, such as a set top box (STB), that receives data from television service provider system 110 and outputs the data for presentation, such as to television 130. Further detail regarding embodiments of television receivers 120 is provided in relation to FIG. 3.

Additionally or alternatively, some other form of device that is capable of outputting television programming may be used instead of television receivers 120. For instance, television programming, such as a live sporting event, may be distributed over an IP network (e.g., including the Internet) using an OTT (over-the-top) distribution network. A computerized device, such as a smartphone, gaming device, or tablet computer may be used to view the television programming and output a sports gaming interface, such as detailed in relation to FIGS. 3-7.

Television service provider system 110 may use a dedicated television-distribution network to communicate with television receivers 120. Additionally or alternatively, network 140 may be used to communicate with television receivers 120 and/or sports gaming server system 150, and content server system 160. Network 140 may include one or more public and/or private networks, which can include the Internet.

Sports gaming server system 150 may be operated by an entity that is distinct from the entity operating television service provider system 110. Sports gaming server system 150 may host various wagers and may be used to set the odds on such wagers. A person located in a jurisdiction that permits sports gaming and is of the correct age may be permitted to place a wager via sports gaming server system 150. A person may be able to access sports gaming server system 150 using a computerized device, such as mobile device 170. Mobile device 170 may allow television viewer 101 to access sports gaming server system 150 via an application installed on mobile device 170 or by using a web browser on mobile device 170 to access the website of sports gaming server system 150. Mobile device 170 may be a smart phone, gaming device, tablet computer, laptop computer, cellular phone, desktop computer, personal digital assistant, or some other form of computerized device.

Television service provider system 110 may communicate with sports gaming server system 150 via network 140. Sports gaming server system 150 may provide an indication of various wagers and the associated odds with such wagers to television service provider system 110. Television service provider system 110 may relay such betting information to television receivers 120. Sports gaming server system 150 may also transmit indications of wagers placed by particular television viewers to television service provider system 110. Television service provider system 110 may relay wagers placed by a particular television viewer to the television viewer's television receiver for presentation.

Content server system 160 may provide information ancillary to sports betting to television service provider system 110. For example, sports gaming server system 150 may indicate the particular wagers and odds that can be placed by a television viewer on a sporting event and content server system 160 may provide television service provider system 110 with details on the sporting event, such as the television station, the time of the sporting event, details of the teams and players participating in the sporting event (e.g., team records, player-specific statistics), the location of the sporting event, and/or other details of the sporting event.

Television viewer 101 may be using television 130 to view the sporting event. The sporting event may be received as live television programming by television receiver 120-3 from television service provider system 110. Television viewer 101 may use a remote control to interact with television receiver 120-3. Television viewer 101 has an option to view a sports gaming interface. In some embodiments, some other form of electronic device may be used, such as a computerized mobile device or smartphone. This sports gaming interface can be output concurrently with television programming, such as the live sporting event being viewed by television viewer 101. The sports gaming interface may function as an application that is installed on television receiver 120-3. Television service provider system 110 may have previously transmitted data to all of television receivers 120 or in response to a request for a particular television receiver initiated by a user, such as television viewer 101. Various embodiments of such a sports gaming interface are detailed in relation to FIGS. 4-7.

Figure 8:
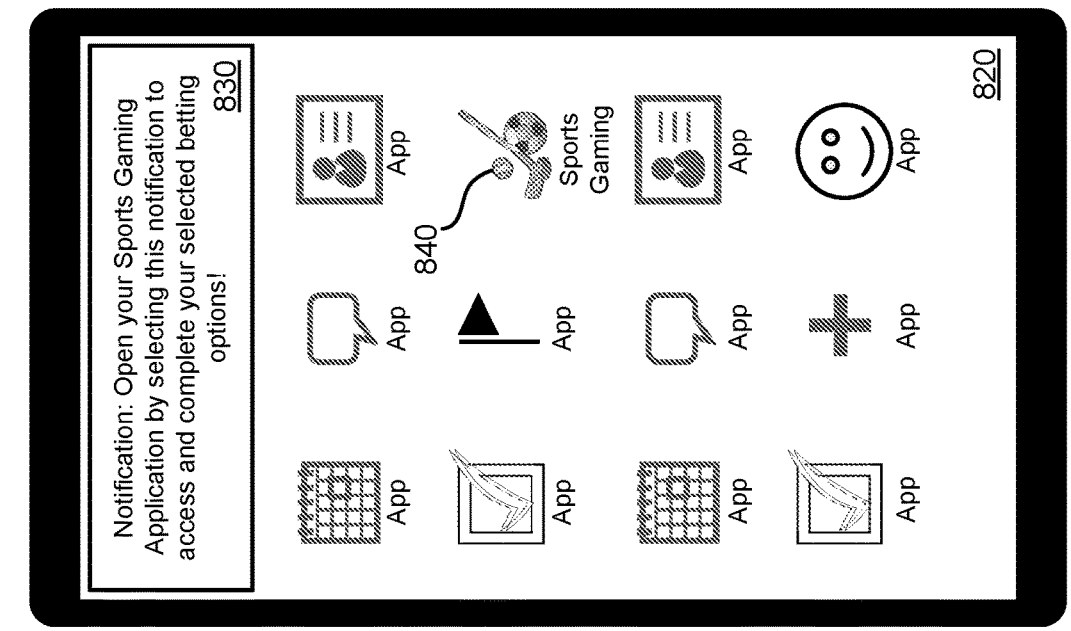
FIG. 8 illustrates an embodiment of a mobile device that has received a notification that allows a television viewer to complete a bet.

Television viewer 101 may also be using mobile device 170. Television viewer 101 may, via the sports gaming interface output by television receiver 120-3, trigger one or more staged wagers to be transmitted to mobile device 170. In such embodiments, the sports gaming interface executed by television receiver 120-3 may transmit a pre-staged wager, which can include an indication of the one or more wagers (a wage identifier) and an account identifier to television service provider system 110. Television service provider system 110 relays this information to sports gaming server system 150 via network 140. Alternatively, the sports gaming interface may use an application programming interface (API) to relay an indication of the one or more wagers to the sports gaming server system 150 (without communicating through television service provider system 110). Sports gaming server system 150 may then be triggered to transmit a link or notification to mobile device 170. In some embodiments, a pop-up notification is presented on mobile device 170, such as illustrated in FIG. 8, that can be selected by television viewer 101. Selection of such notification may cause a website or application executed by mobile device 170 to launch that will include the pre-staged wagers set up by television viewer 101 via the sports gaming interface output by television receiver 120-3. In other embodiments, a link may be sent, such as via text message or email, to mobile device 170. Again here, watching the link may cause a website or application executed by mobile device 170 to launch that will include the pre-staged wagers set up by television viewer 101 of the sports gaming interface output by television receiver 120-3. Television viewer 101 may then edit, fund, and/or otherwise complete the pre-staged wagers set up via the sports gaming interface.

In some embodiments, television receiver 120-3 can communicate with mobile device 170. After television viewer 101 has pre-staged one or more wagers using the sports gaming interface output by television receiver 120-3, television viewer 101 can trigger presentation of a machine-readable code, such as a barcode or QR (Quick Response) code, to be output by television receiver 120-3 and presented via television 130. The machine-readable code may be read by mobile device 170 using an application for reading machine-readable codes or functionality integrated into a sports gaming application associated with sports gaming server system 150. The machine-readable code may have identifiers of the staged wagers embedded. These identifiers may be used by sports gaming server system 150 to cause mobile device 170 to present the staged wagers and allow television viewer 101 to edit, fund, and/or otherwise complete the pre-staged wagers.

In some embodiments, a machine-readable code, such as a barcode or QR code, may be used to pair a television viewer's sports gaming account with a television receiver. The sports gaming application may be caused by a television viewer to present a machine-readable code. From the television viewer's mobile device or from within the sports gaming application on the television viewer's mobile device, the machine-readable code may be captured. The sports gaming application may use information captured from the machine-readable code, such as an identifier, to map the user account active on the mobile device with the instance of the sports gaming application on the television receiver.

Alternatively, an indication of such bets and an associated identifier may be transmitted by television receiver 120-3 to television service provider system 110, which may relay the information to sports gaming server system 150. The associated identifier may be embedded in the machine-readable code and may be acquired by mobile device 170 by imaging the machine-readable code. The associated identifier may then be transmitted by mobile device 170 to sports gaming server system 150 to retrieve the staged wagers that are mapped to the identifier.

Figure 2:
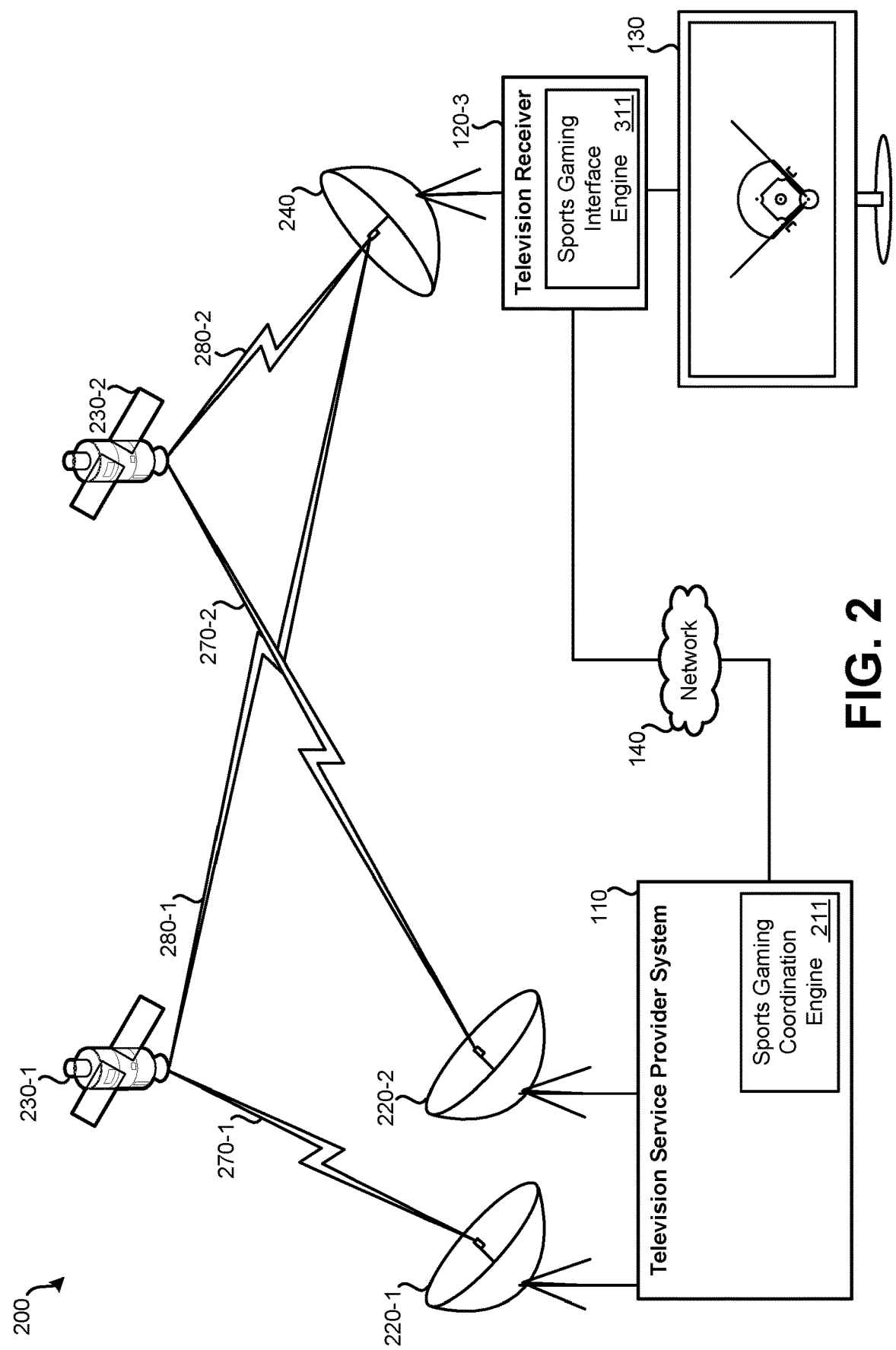
FIG. 2 illustrates an embodiment of a television distribution system.

FIG. 2 illustrates an embodiment of a satellite-based television distributions system 200. Satellite-based television distribution system 200 may include: television service provider system 110, satellite transmitter equipment 220, satellites 230, satellite antenna 240, television receiver 120-3, and television 130. Alternate embodiments of satellite-based television distribution system 200 may include fewer or greater numbers of components. While only one satellite antenna 240, television receiver 120-3, and television 130 (which can collectively be referred to as "user equipment") are illustrated, it should be understood that multiple (e.g., tens, thousands, millions) instances of user equipment may receive television signals from television service provider system 110 via satellites 230.

Television service provider system 110 and satellite transmitter equipment 220 may be operated by a television service provider. A television service provider may distribute television channels that distribute live television programming, on-demand programming, programming information, data, firmware updates, and/or other content/services to users. Television service provider system 110 may receive feeds of one or more live television channels from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 220 (120-1, 220-2) may be used to transmit a feed of one or more television channels from television service provider system 110 to one or more satellites 230. While a single television service provider system 110 and satellite transmitter equipment 220 are illustrated as part of satellite-based television distribution system 200, it should be understood that multiple instances of transmitter equipment may be used, possibly scattered geographically, to communicate with satellites 230. Such multiple instances of satellite transmitting equipment may communicate with the same or with different satellites. Different television channels may be transmitted to satellites 230 from different instances of transmitting equipment. For instance, a different satellite antenna of satellite transmitter equipment 220 may be used for communication with satellites in different orbital slots.

Satellites 230 may be configured to receive signals, such as streams of television channels, from one or more satellite uplinks such as satellite transmitter equipment 220. Satellites 230 may relay received signals from satellite transmitter equipment 220 (and/or other satellite transmitter equipment) to multiple instances of user equipment via transponder streams. Different frequencies may be used for uplink signals 270 from transponder streams 280. Satellites 230 may be in geosynchronous orbit. Each of the transponder streams transmitted by satellites 230 may contain multiple television channels transmitted as packetized data. For example, a single transponder stream may be a serial digital packet stream containing multiple television channels. Therefore, packets for multiple television channels may be interspersed.

Multiple satellites 230 may be used to relay television channels from television service provider system 110 to satellite antenna 240. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 230-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Each transponder stream may be able to carry a finite amount of data. As such, the number of television channels that can be included in a particular transponder stream may be at least partially dependent on the resolution of the video of the television channel. For example, a transponder stream may be able to carry seven or eight television channels at a high resolution, but may be able to carry dozens, fifty, a hundred, two hundred, or some other number of television channels at reduced resolutions.

Satellite antenna 240 may be a piece of user equipment that is used to receive transponder streams from one or more satellites, such as satellites 230. Satellite antenna 240 may be provided to a subscriber for use on a subscription basis to receive television channels provided by the television service provider system 110, satellite transmitter equipment 220, and/or satellites 230. Satellite antenna 240, which may include one or more low noise blocks (LNBs), may be configured to receive transponder streams from multiple satellites and/or multiple transponders of the same satellite. Satellite antenna 240 may be configured to receive television channels via transponder streams on multiple frequencies. Based on the characteristics of television receiver 120-3 and/or satellite antenna 240, it may only be possible to capture transponder streams from a limited number of transponders concurrently. For example, a tuner of television receiver 120-3 may only be able to tune to a single transponder stream from a transponder of a single satellite at a given time. The tuner can then be re-tuned to another transponder of the same or a different satellite. A television receiver 120-3 having multiple tuners may allow for multiple transponder streams to be received at the same time.

In communication with satellite antenna 240 may be one or more television receivers. Television receivers may be configured to decode signals received from satellites 230 via satellite antenna 240 for output and presentation via a display device, such as television 130. A television receiver may be incorporated as part of a television or may be part of a separate device, commonly referred to as a set-top box (STB). Television receiver 120-3 may decode signals received via satellite antenna 240 and provide an output to television 130. FIG. 2 provides additional detail of various embodiments of a television receiver. A television receiver is defined to include set-top boxes (STBs) and also circuitry having similar functionality that may be incorporated with another device. For instance, circuitry similar to that of a television receiver may be incorporated as part of a television. As such, while FIG. 2 illustrates an embodiment of television receiver 120-3 as separate from television 130, it should be understood that, in other embodiments, similar functions may be performed by a television receiver integrated with television 130.

Television 130 may be used to present video and/or audio decoded and output by television receiver 120-3. Television receiver 120-3 may also output a display of one or more interfaces to television 130, such as an electronic programming guide (EPG). In many embodiments, television 130 is a television. Television 130 may also be a monitor, computer, or some other device configured to display video and, possibly, play audio.

Uplink signal 270-1 represents a signal between satellite transmitter equipment 220 and satellite 230-1. Uplink signal 270-2 represents a signal between satellite transmitter equipment 220 and satellite 230-2. Each of uplink signals 270 may contain streams of one or more different television channels. For example, uplink signal 270-1 may contain a first group of television channels, while uplink signal 270-2 contains a second group of television channels. Each of these television channels may be scrambled such that unauthorized persons are prevented from accessing the television channels.

Transponder stream 280-1 represents a transponder stream signal between satellite 230-1 and satellite antenna 240. Transponder stream 280-2 represents a transponder stream signal between satellite 230-2 and satellite antenna 240. Each of transponder streams 280 may contain one or more different television channels, which may be at least partially scrambled. For example, transponder stream 280-1 may be a first transponder stream containing a first group of television channels, while transponder stream 280-2 may be a second transponder stream containing a different group of television channels. When a television channel is received as part of a transponder stream and is decoded and output to television 130 (rather than first storing the television channel to a storage medium as part of DVR functionality, then later outputting the television channel from the storage medium), the television channel may be considered to be viewed "live."

FIG. 2 illustrates transponder stream 280-1 and transponder stream 280-2 being received by satellite antenna 240 and distributed to television receiver 120-3. For a first group of television channels, satellite antenna 240 may receive transponder stream 280-1 and for a second group of channels, transponder stream 280-2 may be received. Television receiver 120-3 may decode the received transponder streams. As such, depending on which television channels are desired to be presented or stored, various transponder streams from various satellites may be received, descrambled, and decoded by television receiver 120-3.

Network 140 may serve as a secondary communication channel between television service provider system 110 and television receiver 120-3. However, in many instances, television receiver 120-3 may be disconnected from network 140 (for reasons such as because television receiver 120-3 is not configured to connect to network 140 or a subscriber does not desire or cannot connect to network 140). As such, the connection between network 140 and television receiver 120-3 is represented by a dotted line. Via such a secondary communication channel, bidirectional exchange of data may occur. As such, data may be transmitted to television service provider system 110 from television receiver 120-3 via network 140. Data may also be transmitted from television service provider system 110 to television receiver 120-3 via network 140. Network 140 may be the Internet. While audio and video services may be provided to television receiver 120-3 via satellites 230, feedback from television receiver 120-3 to television service provider system 110 may be transmitted via network 140. In some embodiments, sports gaming data to populate the sports gaming application may be sent via satellites 230 such that a television viewer can use the sports gaming application even if no internet application is available to television receiver 120-3.

Television service provider system 110, which can include one or more computer server systems, can execute sports gaming coordinate engine 211. Sports gaming coordination engine 211 may serve as an intermediary between television receivers and sports gaming server system 150. Sports gaming coordination engine 211 may forward information from sports gaming server system 150 to the appropriate television receiver. Sports gaming coordinate engine 211 may forward information from a television receiver, such as television receiver 120-3, to sports gaming server system 150. Sports gaming coordinate engine 211 may maintain a datastore that indicates an account identifier or television receiver identifier that is mapped to a sports gaming account identifier. Therefore, if sports gaming coordinate engine 211 receives data mapped to a particular sports gaming account identifier, television service provider system 110 can forward the information, either via network 140 or via satellite, to the appropriate television receiver.

Figure 3:
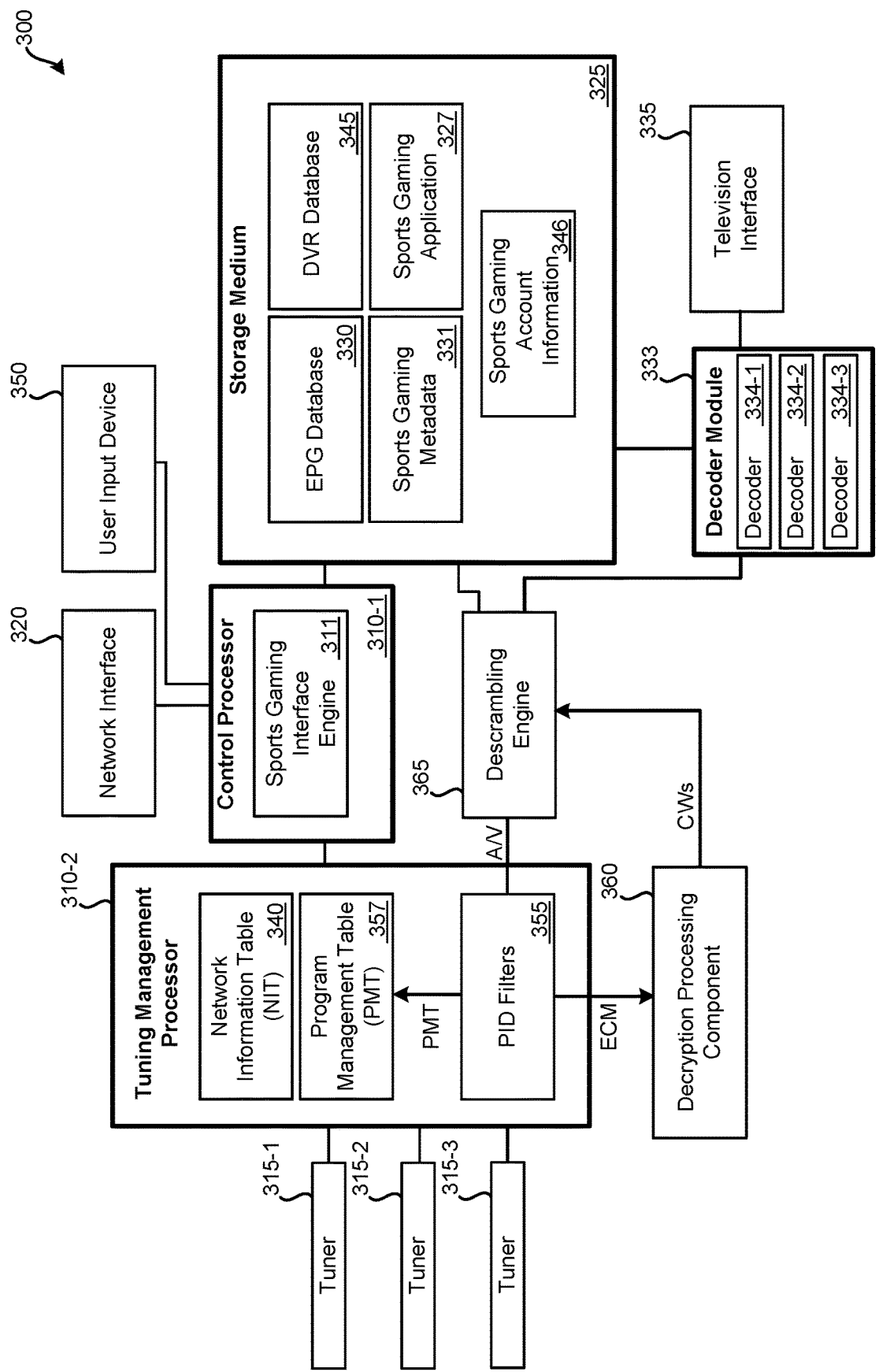
FIG. 3 illustrates an embodiment of a television receiver.

FIG. 3 illustrates an embodiment of a television receiver 300. Television receiver 300 may be in the form of a separate device configured to be connected with a display device, such as a television. Embodiments of television receiver 300 can include set top boxes (STBs). As previously noted, in addition to being in the form of an STB, a television receiver may be incorporated as part of another device, such as a television or other form of display device. For example, a television may have an integrated television receiver (which does not involve an external STB being coupled with the television).

Television receiver 300 may represent any of television receivers 120 of FIG. 1 and may be in the form of an STB that outputs video and/or audio to a display device, such as a television. Television receiver 300 may include: processors 310 (which may include control processor 310-1, tuning management processor 310-2, and possibly additional processors), tuners 315, network interface 320, non-transitory computer-readable storage medium 325, electronic programming guide (EPG) database 330, television interface 335, networking information table (NIT) 340, digital video recorder (DVR) database 345 (which may include provider-managed television programming storage and/or user-defined television programming), sports gaming application 327, sports gaming metadata 331, sports gaming account information 346, user input device 350, decryption processing component 360 (which can be in the form of a removable or non-removable smartcard), and/or descrambling engine 365. In other embodiments of television receiver 300, fewer or greater numbers of components may be present. It should be understood that the various components of television receiver 300 may be implemented using hardware, firmware, software, and/or some combination thereof. Functionality of components may be combined; for example, functions of descrambling engine 365 may be performed by tuning management processor 310-2. Further, functionality of components may be spread among additional components; for example, PID (packet identifier) filters 355 may be handled by separate hardware from program management table 357.

Processors 310 may include one or more specialized and/or general-purpose processors configured to perform processes such as tuning to a particular channel, accessing and displaying EPG information from EPG database 330, and/or receiving and processing input from a user. For example, processors 310 may include one or more processors dedicated to decoding video signals from a particular format, such as MPEG, for output and display on a television and for performing decryption. It should be understood that the functions performed by various modules of FIG. 3 may be performed using one or more processors. As such, for example, functions of descrambling engine 365 may be performed by control processor 310-1.

Control processor 310-1 may communicate with tuning management processor 310-2. Control processor 310-1 may control the recording of television channels based on timers stored in DVR database 345. Control processor 310-1 may also provide commands to tuning management processor 310-2 when recording of a television channel is to cease. In addition to providing commands relating to the recording of television channels, control processor 310-1 may provide commands to tuning management processor 310-2 that indicate television channels to be output to decoder module 333 for output to a display device. Control processor 310-1 may also communicate with network interface 320 and user input device 350. Control processor 310-1 may handle incoming data from network interface 320 and user input device 350. Additionally, control processor 310-1 may be configured to output data via network interface 320. Control processor 310-1 may execute sports gaming interface engine 311.

Tuners 315 may include one or more tuners used to tune to transponders that include broadcasts of one or more television channels. In the illustrated embodiment of television receiver 300, three tuners are present (tuner 315-1, tuner 315-2, and tuner 315-3). In other embodiments, two or more than three tuners may be present, such as four, six, or eight tuners. Each tuner contained in tuners 315 may be capable of receiving and processing a single transponder stream from a satellite transponder at a given time. As such, a single tuner may tune to a single transponder stream at a given time. If tuners 315 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 315 may be used to receive the signal containing the multiple television channels for presentation and/or recording. Tuners 315 may receive commands from tuning management processor 310-2. Such commands may instruct tuners 315 which frequencies or transponder streams to tune.

Network interface 320 may be used to communicate via an alternate communication channel with a television service provider, if such communication channel is available. The primary communication channel may be via satellite (which may be unidirectional to television receiver 300) and the alternate communication channel (which may be bidirectional) may be via a network, such as the Internet. Referring back to FIG. 2, television receiver 120-3 may be able to communicate with television service provider system 110 via a network, such as the Internet. This communication may be bidirectional: data may be transmitted from television receiver 120-3 to television service provider system 110 and from television service provider system 110 to television receiver 120-3. Referring back to FIG. 3, network interface 320 may be configured to communicate via one or more networks, such as the Internet, to communicate with television service provider system 110 of FIG. 2. Information may be transmitted and/or received via network interface 320. For instance, sports gaming data from a television service provider may also be received via network interface 320, if connected with the Internet.

Storage medium 325 may represent one or more non-transitory computer-readable storage mediums. Storage medium 325 may include non-transitory memory and/or a hard drive. Storage medium 325 may be used to store information received from one or more satellites and/or information received via network interface 320. Storage medium 325 may store information related to EPG database 330, sports gaming metadata 331, DVR database 345, sports gaming account information 346 and/or sports gaming application 327. Recorded television programs, which were recorded based on a provider- or user-defined timer may be stored using storage medium 325 as part of DVR database 345. Storage medium 325 may be partitioned or otherwise divided (such as into folders) such that predefined amounts of storage medium 325 are devoted to storage of television programs recorded due to user-defined timers and stored television programs recorded due to provider-defined timers.

EPG database 330 may store information related to television channels and the timing of programs appearing on such television channels. EPG database 330 may be stored using storage medium 325, which may be a hard drive. Information from EPG database 330 may be used to inform users of what television channels or programs are popular and/or provide recommendations to the user. Information from EPG database 330 may provide the user with a visual interface displayed by a television that allows a user to browse and select television channels and/or television programs for viewing and/or recording. Information used to populate EPG database 330 may be received via network interface 320 and/or via satellites, such as satellites 230 of FIG. 2 via tuners 315. For instance, updates to EPG database 330 may be received periodically via satellite. EPG database 330 may serve as an interface for a user to control DVR functions of television receiver 300, and/or to enable viewing and/or recording of multiple television channels simultaneously.

Sports gaming application 327 may be installed as software on all television receivers or may be installed based on a request from a television viewer. Sports gaming application 327, when executed, may cause sports gaming interface engine 311 to be executed as a process by control processor 310-1 or some other processor of television receiver 300. Sports gaming application 327 may enable bidirectional communication with sports gaming server system 150 via television service provider system 110. Alternatively, sports gaming application 327 may only present information obtained from sports gaming server system 150 and communication back to sports gaming server system 150 may be performed through a separate device, such as mobile device 170. Sports gaming interface engine 311, when triggered based on user input, may cause a sports gaming interface to be presented either by itself or simultaneously with television programming being output via television interface 335.

Sports gaming account information 346 may be or include an authorization token (e.g., an Oauth token) or a combination of a username and password used by a user to log into the user's sports gaming account. The television viewer may provide his username and password to sports gaming interface engine 311. This data may be stored and may be used to log into the user's sports gaming account when the sports gaming application is accessed. Sports gaming metadata 331 may represent temporary sports wagering data obtained from sports gaming server system 150, such as wagers currently available, the corresponding odds of such wagers, and/or limits on such wagers. Additionally, some of sports gaming metadata 331 may be obtained from television service provider system 110 (which may, in turn, have obtained the data from content server system 160).

The network information table (NIT) 340 may store information used by television receiver 300 to access various television channels. NIT 340 may be stored locally by a processor, such as tuning management processor 310-2 and/or by storage medium 325. Information used to populate NIT 340 may be received via satellite (or cable) through tuners 315 and/or may be received via network interface 320 from the television service provider. As such, information present in NIT 340 may be periodically updated. In some embodiments, NIT 340 may be locally stored by television receiver 300 using storage medium 325. Generally, NIT 340 may store information about a service provider network, such as a satellite-based service provider network. Information that may be present in NIT 340 may include: television channel numbers, satellite identifiers (which may be used to ensure different satellites are tuned to for reception of timing signals), frequency identifiers and/or transponder identifiers for various television channels. In some embodiments, NIT 340 may contain additional data or additional tables may be stored by the television receiver. For example, while specific audio PIDs and video PIDs may not be present in NIT 340, a channel identifier may be present within NIT 340 which may be used to look up the audio PIDs and video PIDs in another table, such as a program map table (PMT). In some embodiments, a PID associated with the data for the PMT is indicated in a separate table, program association table (PAT), which is not illustrated in FIG. 3. A PAT may be stored by the television receiver in a similar manner to the NIT. For example, a PMT may store information on audio PIDs, and/or video PIDs. A PMT stores data on ECM (entitlement control message) PIDs for television channels that are transmitted on a transponder frequency. If, for a first television channel, multiple television channels are to be tuned to, NIT 340 and/or PMT 357 may indicate a second television channel that is to be tuned to when a first channel is tuned to.

Based on information in the NIT, it may be possible to determine the proper satellite and transponder to which to tune for a particular television channel. In some embodiments, the NIT may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

While a large portion of storage space of storage medium 325 is devoted to storage of television programming, a portion may be devoted to storage of non-audio/video data, such as EPG database 330. This "other" data may permit television receiver 300 to function properly. In some embodiments, at least ten gigabytes are allocated to such other data. For example, if NIT 340 is stored by storage medium 325, it may be part of other non-video/audio data 326.

Decoder module 333 may serve to convert encoded video and audio into a format suitable for output to a display device. For instance, decoder module 333 may receive MPEG video and audio from storage medium 325 or descrambling engine 365 to be output to a television. MPEG video and audio from storage medium 325 may have been recorded to DVR database 345 as part of a previously recorded television program. Decoder module 333 may convert the MPEG video and audio into a format appropriate to be displayed by a television or other form of display device and audio into a format appropriate to be output from speakers, respectively. Decoder module 333 may have the ability to convert a finite number of television channel streams received from storage medium 325 or descrambling engine 365 simultaneously. For instance, each of decoders 334 within decoder module 333 may be able to only decode a single television channel at a time. While decoder module 333 is illustrated as having three decoders 334 (decoder 334-1, decoder 334-2, and decoder 334-3), in other embodiments, a greater or fewer number of decoders may be present in television receiver 300. A decoder may be able to only decode a single high definition television program at a time.

Television interface 335 may serve to output a signal to a television (or another form of display device) in a proper format for display of video and playback of audio. As such, television interface 335 may output one or more television channels, stored television programming from storage medium 325 (e.g., television programs from DVR database 345, information from EPG database 330) to a television for presentation.

Digital Video Recorder (DVR) functionality may permit a television channel to be recorded for a period of time. DVR functionality of television receiver 300 may be managed by control processor 310-1. Control processor 310-1 may coordinate the television channel, start time, and stop time of when recording of a television channel is to occur. DVR database 345 may store information related to the recording of television channels. DVR database 345 may store timers that are used by control processor 310-1 to determine when a television channel should be tuned to and its programs recorded to DVR database 345 of storage medium 325. In some embodiments, a limited amount of storage medium 325 may be devoted to DVR database 345. Timers may be set by the television service provider and/or one or more users of television receiver 300.

DVR database 345 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 300 via the television provider's network. For example, referring to satellite-based television distribution system 200 of FIG. 2, in a satellite-based television service provider system, data necessary to create the provider-defined timers at television receiver 120-3 may be received via satellite.

As an example of DVR functionality of television receiver 300 being used to record based on provider-defined timers, a television service provider may configure television receiver 300 to record television programming on multiple, predefined television channels for a predefined period of time, on predefined dates. For instance, a television service provider may configure television receiver 300 such that television programming may be recorded from 7 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 325 for provider-managed television programming storage.

User input device 350 may include a remote control (physically separate from television receiver 300) and/or one or more buttons on television receiver 300 that allow a user to interact with television receiver 300. User input device 350 may be used to select a television channel for viewing, provide input to sports gaming interface engine 311, view information from EPG database 330, and/or program a timer stored to DVR database 345, wherein the timer is used to control the DVR functionality of control processor 310-1. In some embodiments, it may be possible to load some or all of preferences to a remote control. As such, the remote control can serve as a backup storage device for the preferences.

Referring back to tuners 315, television channels received via satellite (or cable) may contain at least some scrambled data. Packets of audio and video may be scrambled to prevent unauthorized users (e.g., nonsubscribers) from receiving television programming without paying the television service provider. When a tuner of tuners 315 is receiving data from a particular transponder of a satellite, the transponder stream may be a series of data packets corresponding to multiple television channels. Each data packet may contain a packet identifier (PID), which, in combination with NIT 340 and/or PMT 357, can be determined to be associated with a particular television channel. Particular data packets, referred to as entitlement control messages (ECMs), may be periodically transmitted. ECMs may be associated with another PID and may be encrypted; television receiver 300 may use decryption engine 361 of decryption processing component 360 to decrypt ECMs. Decryption of an ECM may only be possible if the user has authorization to access the particular television channel associated with the ECM. When an ECM is determined to correspond to a television channel being stored and/or displayed, the ECM may be provided to decryption processing component 360 for decryption.

When decryption processing component 360 receives an encrypted ECM, decryption processing component 360 may decrypt the ECM to obtain some number of control words. In some embodiments, from each ECM received by decryption processing component 360, two control words are obtained. In some embodiments, when decryption processing component 360 receives an ECM, it compares the ECM to the previously received ECM. If the two ECMs match, the second ECM is not decrypted because the same control words would be obtained. In other embodiments, each ECM received by decryption processing component 360 is decrypted; however, if a second ECM matches a first ECM, the outputted control words will match; thus, effectively, the second ECM does not affect the control words output by decryption processing component 360. Decryption processing component 360 may be permanently part of television receiver 300 or may be configured to be inserted and removed from television receiver 300.

Tuning management processor 310-2 may be in communication with tuners 315 and control processor 310-1. Tuning management processor 310-2 may be configured to receive commands from control processor 310-1. Such commands may indicate when to start/stop recording a television channel and/or when to start/stop causing a television channel to be output to a television. Tuning management processor 310-2 may control tuners 315. Tuning management processor 310-2 may provide commands to tuners 315 that instruct the tuners which satellite, transponder, and/or frequency to tune to. From tuners 315, tuning management processor 310-2 may receive transponder streams of packetized data. As previously detailed, some or all of these packets may include a PID that identifies the content of the packet.

Tuning management processor 310-2 may be configured to create one or more PID filters 355 that sort packets received from tuners 315 based on the PIDs. When a tuner is initially tuned to a particular frequency (e.g., to a particular transponder of a satellite), a PID filter may be created based on the PMT data. The PID filter created, based on the PMT data packets, may be known because it is stored as part of NIT 340 or another table, such as a program association table (PAT). From the PMT data packets, PMT may be constructed by tuning management processor 310-2.

PID filters 355 may be configured to filter data packets based on PIDs. In some embodiments, PID filters 355 are created and executed by tuning management processor 310-2. For each television channel to be output for presentation or recorded, a separate PID filter may be configured. In other embodiments, separate hardware may be used to create and execute such PID filters. Depending on a television channel selected for recording/viewing, a PID filter may be created to filter the video and audio packets associated with the television channel (based on the PID assignments present in PMT 357). For example, if a transponder data stream includes multiple television channels, data packets corresponding to a television channel that is not desired to be stored or displayed by the user may be ignored by PID filters 355. As such, only data packets corresponding to the one or more television channels desired to be stored and/or displayed may be filtered and passed to either descrambling engine 365 or decryption processing component 360; other data packets may be ignored. For each television channel, a stream of video packets, a stream of audio packets (one or both of the audio programs) and/or a stream of ECM packets may be present, each stream identified by a PID. In some embodiments, a common ECM stream may be used for multiple television channels. Additional data packets corresponding to other information, such as updates to NIT 340, may be appropriately routed by PID filters 355. At a given time, one or multiple PID filters may be executed by tuning management processor 310-2.

Descrambling engine 365 may use the control words output by decryption processing component 360 in order to descramble video and/or audio corresponding to television channels for storage and/or presentation. Video and/or audio data contained in the transponder data stream received by tuners 315 may be scrambled. Video and/or audio data may be descrambled by descrambling engine 365 using a particular control word. Which control word output by decryption processing component 360 to be used for successful descrambling may be indicated by a scramble control identifier present within the data packet containing the scrambled video or audio. Descrambled video and/or audio may be output by descrambling engine 365 to storage medium 325 for storage (in DVR database 345) and/or to decoder module 333 for output to a television or other presentation equipment via television interface 335.

For simplicity, television receiver 300 of FIG. 3 has been reduced to a block diagram; commonly known parts, such as a power supply, have been omitted. Further, some routing between the various modules of television receiver 300 has been illustrated. Such illustrations are for exemplary purposes only. The state of two modules not being directly or indirectly connected does not indicate the modules cannot communicate. Rather, connections between modules of the television receiver 300 are intended only to indicate possible common data routing. It should be understood that the modules of television receiver 300 may be combined into a fewer number of modules or divided into a greater number of modules. Further, the components of television receiver 300 may be part of another device, such as built into a television.

Figure 4:
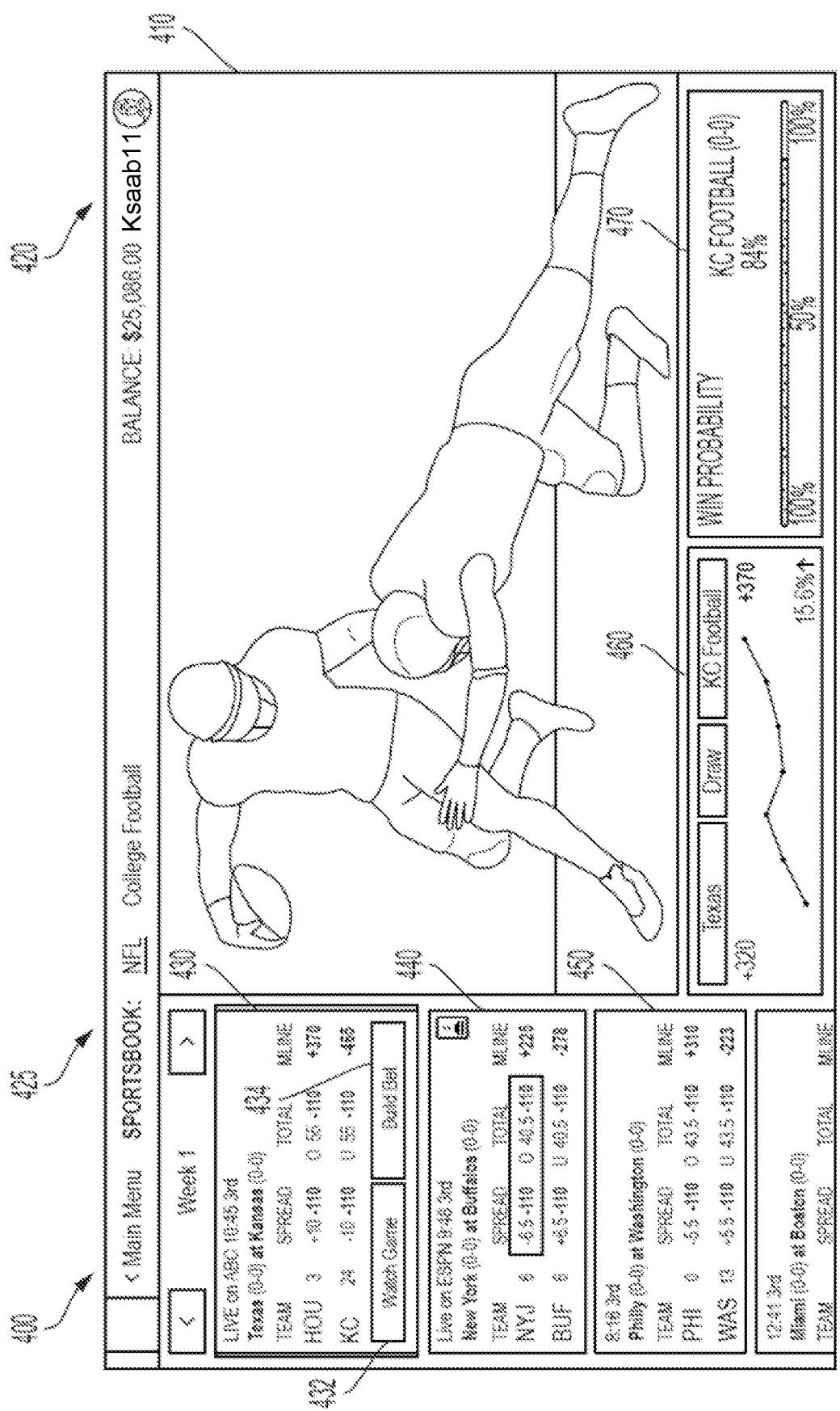
FIG. 4 illustrates an embodiment of a sports gaming interface.

Any of the interfaces in FIGS. 4-7 may be generated by sports gaming interface engine 311 and output via television interface 335 presentation by a display device, such as television 130. FIG. 4 illustrates an embodiment of a sports gaming interface 400 ("interface 400").

Television viewing region 410 may correspond to live television programming being output by the television receiver on a television channel that has been selected by the television. For example, the live television channel that was being output when a user activated the sports programming interface may continue to be output in a smaller area to permit room for interface 400 to be presented.

Account information 420 may indicate a user account that has been logged in via the sports gaming interface. The television viewer may have, during this session or a previous session, provided a username and password to sports gaming interface 400. Alternatively, the username and password may be provided to another server system, such as television service provider system 110 and/or sports gaming server system 150. Based on the username and password, the television receiver may have retrieved, via television service provider system 110 and sports gaming server system 150, information relating to the television viewer's account. A balance, presented in a currency that corresponds to the television viewer's location, may be presented as part of the television viewer's account information.

Via sportsbook selector 425, the television viewer may be able to select a particular sports book in which the television viewer desires to browse wagers. Sports listed under the sports book may be sports which have games scheduled for today or for which the season is on-going.

A separate gaming zone may be presented for each sporting event in the currently selected sports book. Zone 430 can correspond to a first sporting event, zone 440 may correspond to a second sporting event, zone 450 may correspond to a third sporting event, and so on. Currently, zone 430 is selected; within zone 430, the television viewer may be presented with multiple selectable elements. Element 432 may permit the television viewer to select a particular sporting event for viewing, for recording, and/or to change the channel to the particular sporting event for viewing at a particular time. If element 432 is selected, the live television programming output in television viewing region 410 may be updated to present the sporting event corresponding to element 432. Selection of element 432 may only be permitted if the television channel on which the sporting event is being broadcast live is available under the television viewer's subscription. Other factors may additionally or alternatively affect whether selection or viewing is permitted, such as: time; whether an event is available in the television viewer's geographic region; whether available via the television service provider (via any form of subscription); and/or no match is found between the sporting event indicated in for the element and sporting events listed in the television receiver's EPG database.

If the television viewer desires to potentially place a wager on the sporting event of zone 430, the television viewer may select element 434. When element 434 has been selected, the television viewer may then be permitted to interact with more detailed elements corresponding to zone 430. For instance, individual elements regarding teams, the spread, the over/under, or payouts on a moneyline wager may not be eligible to be selected until the television viewer selects element 434. Further detail regarding zone 430 is provided in relation to FIG. 5 when element 434 has been selected.

Zones 460 and 470 may provide more information about the sporting event currently selected in zone 430, which can include game-related statistics, advertisements, and/or specific wagering opportunities or odds boosts. For example, zone 460 may indicate a trend in the change of an amount of payout over time based on when a moneyline wager is placed. Zone 470 may be directed to the likelihood of a particular team winning a sporting event.

Figure 5:
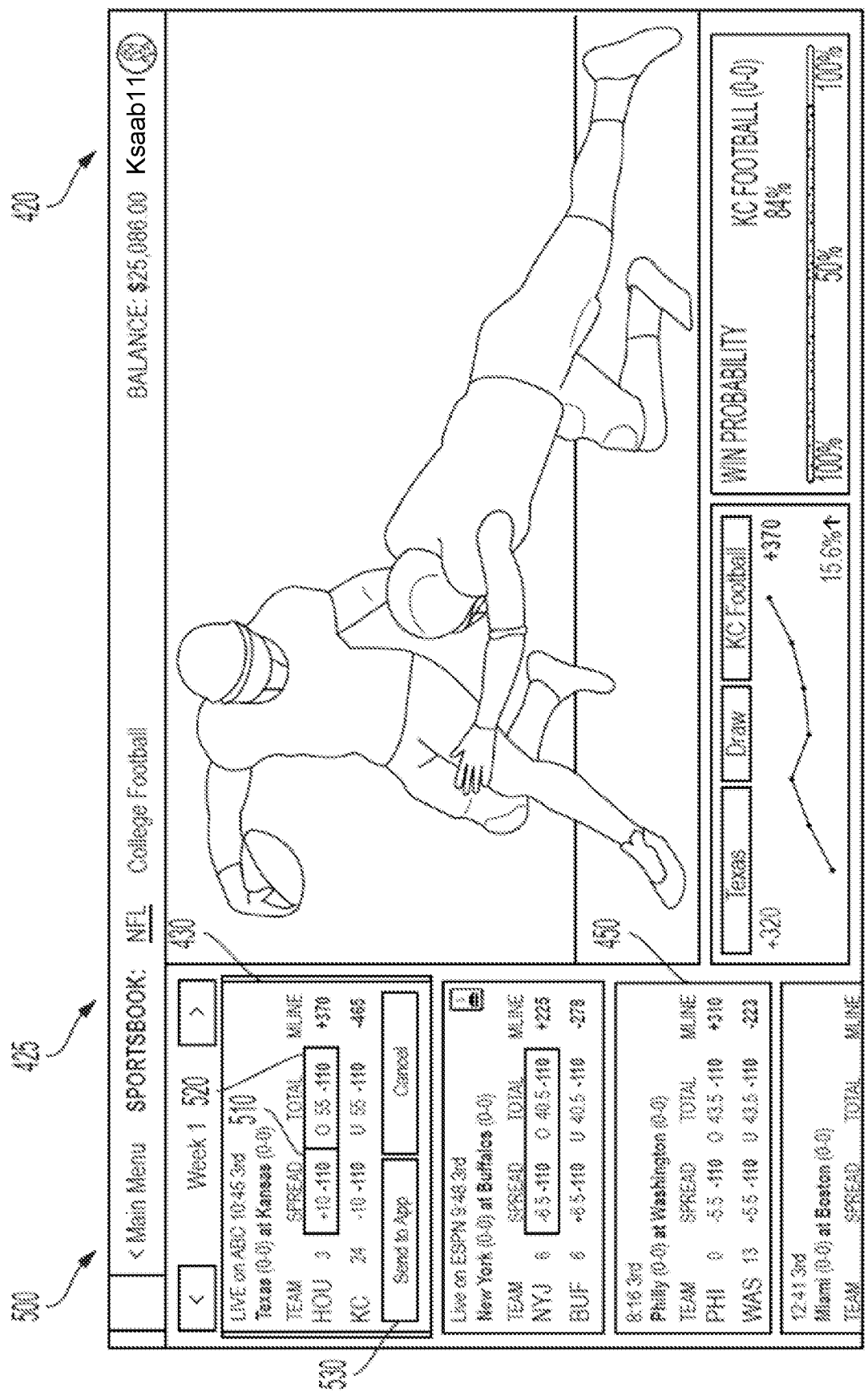
FIG. 5 illustrates an embodiment of a sports gaming interface in which a television viewer can select a particular bet.

FIG. 5 illustrates an embodiment of a sports gaming interface in which a television viewer can select a particular bet. For interface 500, a television viewer has selected element 434. After element 434 has been selected, the television viewer may be permitted to navigate within zone 430 and select particular wagers that the television viewer desires to place. The television viewer may be permitted to select a single wager or may be permitted to select multiple wagers at once. For example, selection 510 indicates that the television viewer has selected to place a bet on the spread for a particular team. Current selection 520 indicates a currently highlighted selection. If the television viewer decides to place a wager on this aspect of the sporting event, the television viewer can provide input to also select placing a bet on the 55 point over in this example.

Once a television viewer has selected the one or more wagers that the television viewer desires to place, the television viewer may select element 530. In some embodiments, the television viewer may also input the amount of money he desires to fund each selected wager. In other embodiments, the television viewer may input the specific amount of money to be wagered via the mobile device application. Element 530 can trigger transmission of the television viewer's staged wagers to a mobile device of the television viewer. As previously detailed, transmission of these staged wagers may be sent to the mobile device by the staged wagers being transmitted to television service provider system 110, which relays the staged wagers to sports gaming server system 150, which, in turn, sends a link or notification to mobile device 170. Alternatively, a machine-readable code may be presented that can be imaged by mobile device 170. The machine-readable code may have the staged wagers encoded or the machine readable-code may allow the staged wagers to be retrieved from sports gaming server system 150.

Figure 6:
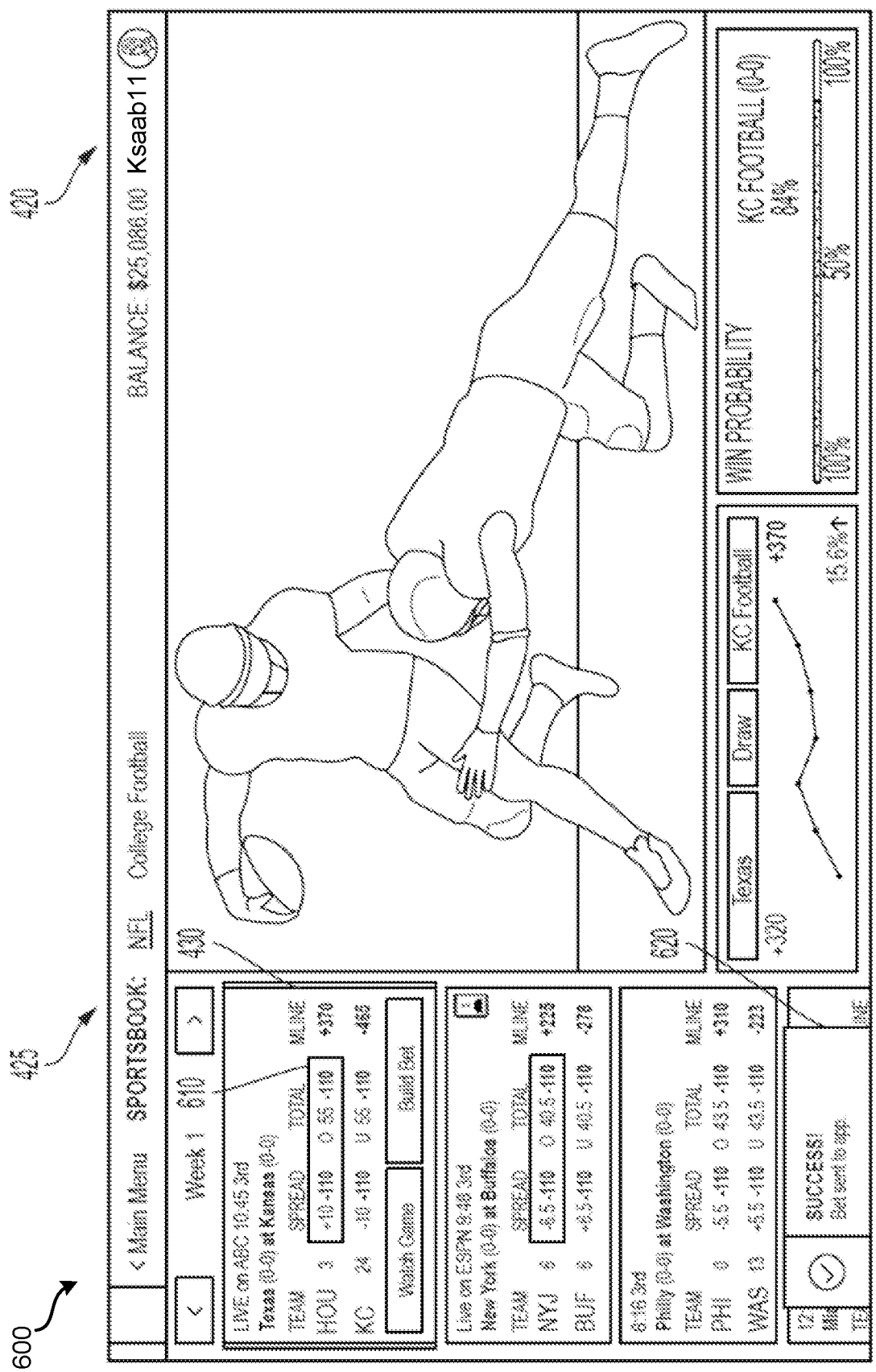
FIG. 6 illustrates an embodiment of a sports gaming interface in which a particular bet has been sent to the television viewer's mobile device.

FIG. 6 illustrates an embodiment of a sports gaming interface 600 ("interface 600") in which two staged wagers have been sent to the television viewer's mobile device. Interface 600 may be presented following interface 608 television viewer causing the staged wagers to be sent to the mobile device of the television viewer. Wagers 610 may be shown as highlighted because the television viewer selected them for sending to his mobile device. Notification 620 may be presented to indicate that the one or more wagers have been successfully transmitted to the mobile device of the television viewer.

Figure 7:
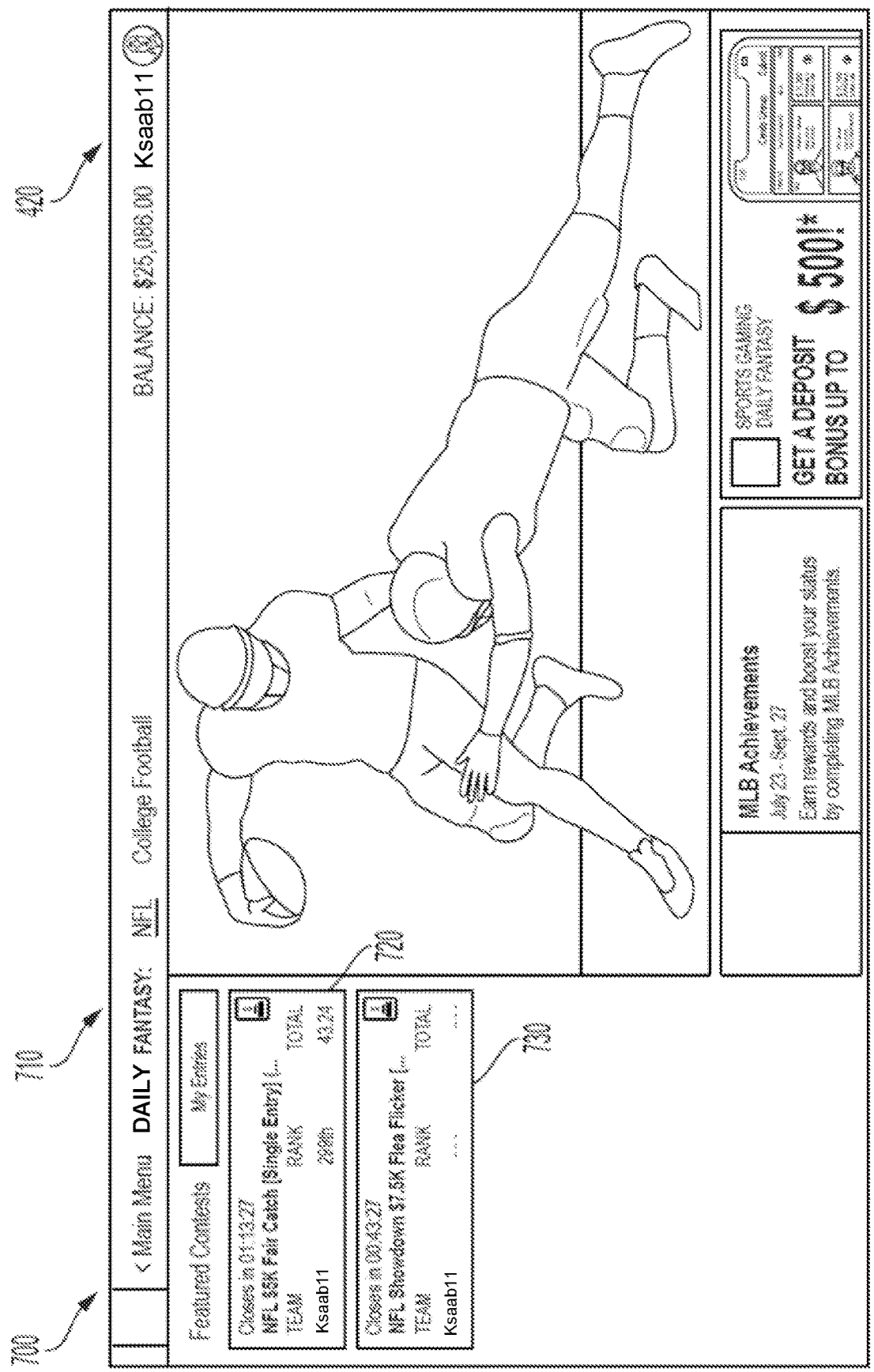
FIG. 7 illustrates an embodiment of a sports gaming interface for reviewing completed bets.

FIG. 7 illustrates an embodiment of a sports gaming interface ("interface 700") for reviewing completed fantasy entries. Interface 700 may be presented after a television viewer has completed one or more staged wagers or fantasy entries on his mobile device. Interface 700 is directed to fantasy football, which may or may not involve money being wagered. In some embodiments, a prize may be provided to a winner but no entry fee may be required. After a television viewer has completed (e.g., funded) a wager using his mobile device, the television receiver of the television viewer may be provided with information corresponding to the television viewer's completed wagers or entries.

Region 710 indicates that the television viewer is viewing his football fantasy entries. With the television viewer's entries, wager card 720 indicates the television viewer's rank and point total within a first fantasy league. Wager card 730 indicates the television viewer's rank and point total within a second fantasy league.

In an embodiment in which monetary wagering occurs, electronic bet slips or electronic wager slips may be presented as wager cards. Such wager cards may indicate: the amount wagered, the sport and team wagered on, the time of the sports event, the payout for winning, a transaction identifier, etc. The electronic bet slip may be presented within interface 700 until a defined amount of time after the sporting event has ended. In other embodiments, electronic bet slips are presented in order from newest to oldest. A television viewer may be permitted to scroll through his previous electronic bet slips.

FIG. 8 illustrates an embodiment of a mobile device 800 that has received a notification that allows a television viewer to complete a staged wager. Mobile device 800 can represent an embodiment of mobile device 170. On mobile device 800, notification 830 may be presented in display screen 820. Notification 830, when selected, may cause sports gaming application 840 to launch and for one or more wagers staged through the sports gaming interface on the television receiver to be presented. On the mobile device, the television viewer can indicate: the amount of money for each staged wager; whether to complete each staged wager; a funding source for each wager; etc. When the user completes the one or more staged wagers, an electronic wager slip for each wager may be issued and accessible to the television viewer via mobile device 800. Alternative to notification 830, a link may be sent in a text message or email. Alternatively, an in-app notification may be presented if the television viewer has activated sports gaming application 840.

Figure 9A:
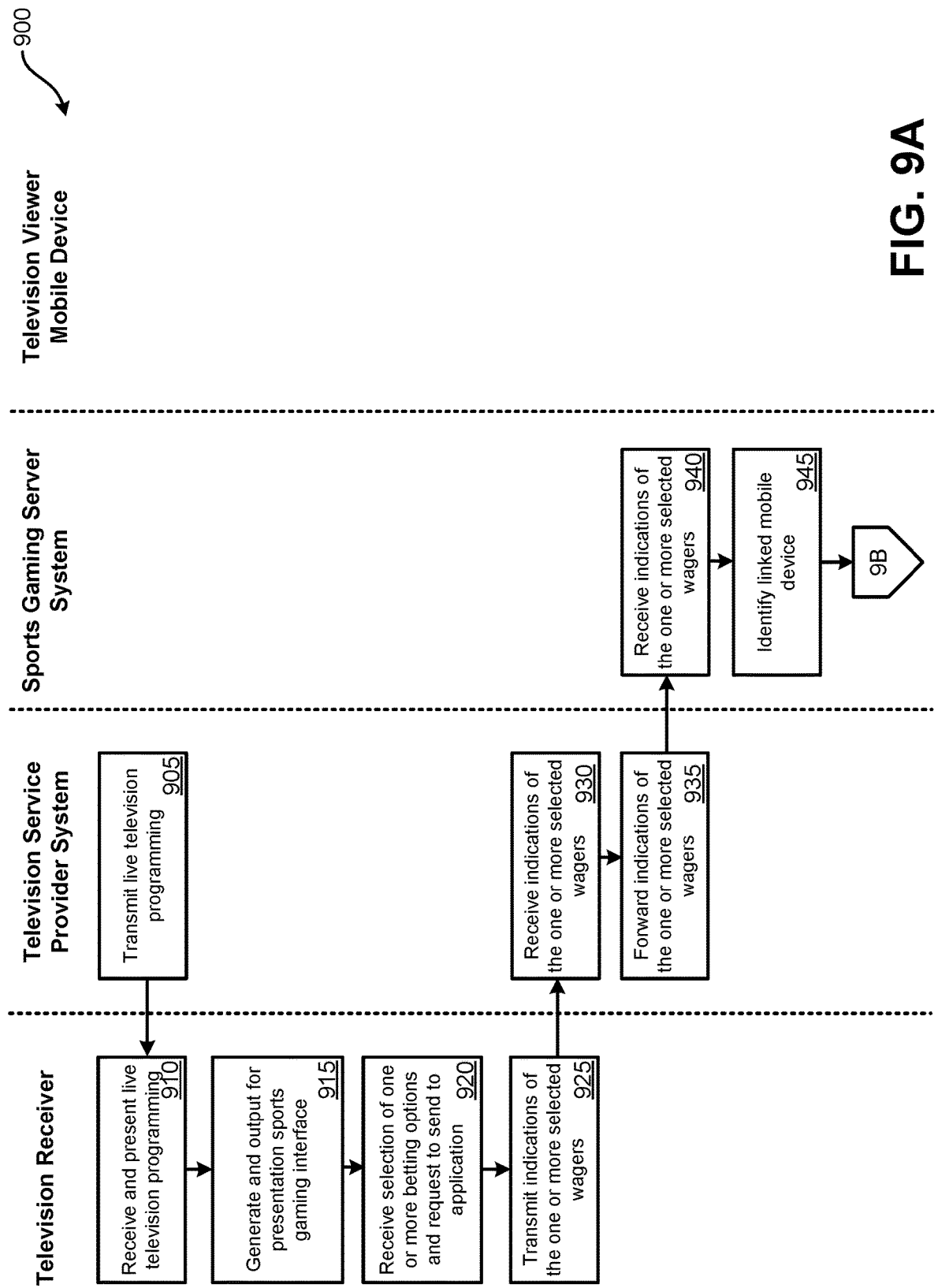
FIGS. 9A and 9B illustrate an embodiment of a method for integrating sports gaming with live television.
Figure 9B:
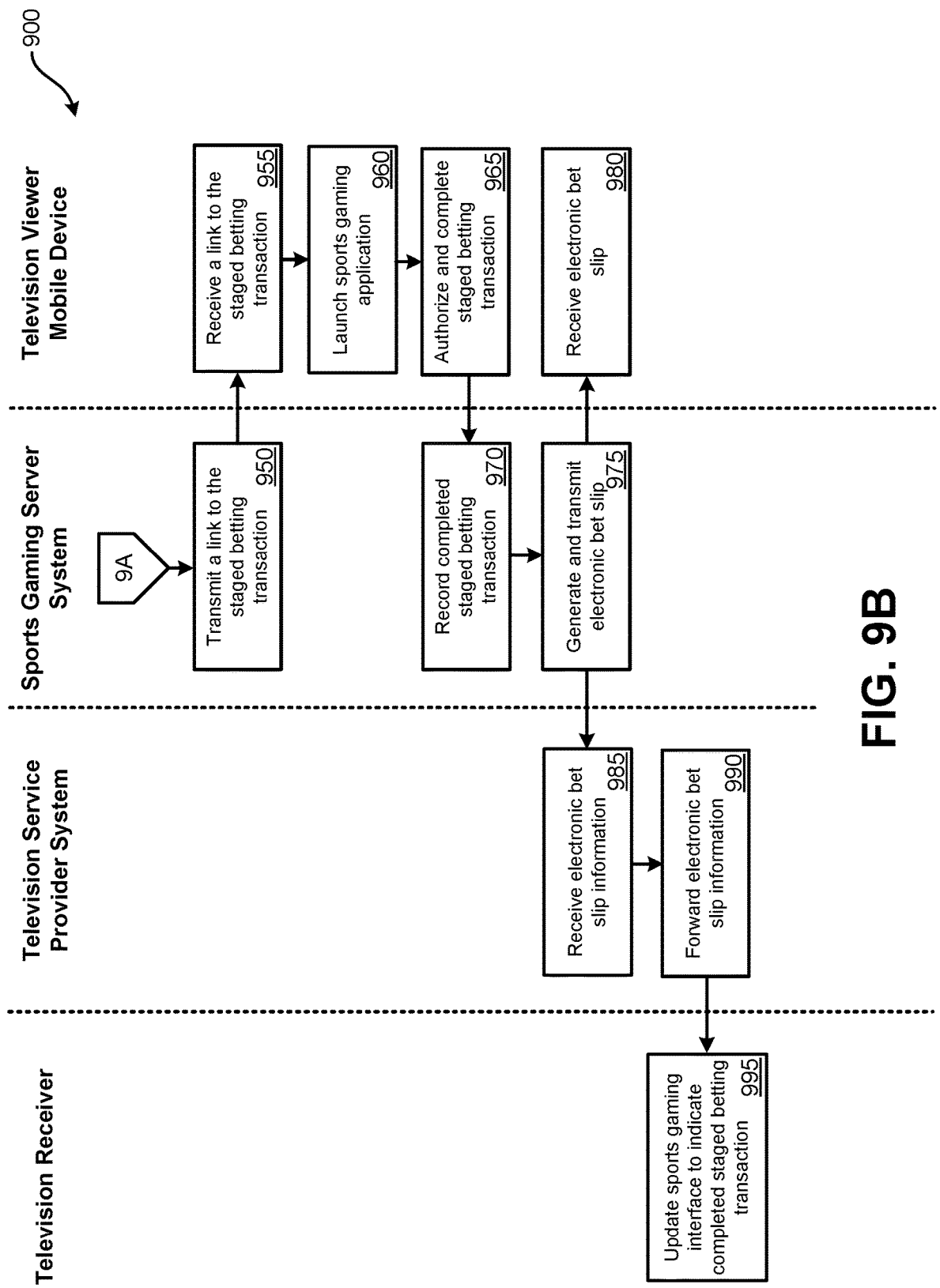

Various methods may be performed using the systems, devices, and interfaces detailed in relation to FIGS. 1-8. FIGS. 9A and 9B illustrate an embodiment of a method 900 for integrating sports gaming with live television via a television receiver. Method 900 may be performed using the systems and devices of FIGS. 1-3 and using various embodiments of interfaces that incorporate at least some aspects of the interfaces of FIGS. 4-8.

Method 900 begins on FIG. 9A. At block 905, live television programming may be transmitted by the television service provider system to the television receiver. At block 910, the live television programming, which may be a sporting event, may be received and output for presentation by the television receiver, such as to a display device such as a television. It may also be possible for the television viewer to select stored content (e.g., recorded content or on-demand content) for presentation.

At block 915, such as in response to a request of a television viewer, a sports gaming interface may be generated and output for presentation. The sports gaming interface may be generated based on information retrieved from a sports gaming server system (e.g., available wagers, odds, payouts, etc.) and a content server system (e.g., the time/date of a sporting event, statistics related to the sporting event, etc.). As detailed in relation to FIGS. 4-8, live television programming that has been selected by the television viewer for presentation may be output concurrently with the sports gaming interface. The television viewer may have the option to select from one or more modes in which the sports gaming interface is presented concurrently with live television programming or in which the sports gaming interface is presented in a larger format that occupies the entire display area.

Using the sports gaming interface, the television viewer may select one or more wagering options. This can involve the television viewer navigating within the sports gaming interface, such as by providing input using a remote control that communicates with the television receiver, and selecting one or more available wagers on one or more sporting events. At block 920, the television receiver may receive a selection of the one or more desired wagers from a group of possible wagering options followed by a request to send the selected wagers to an application installed on a mobile device of the television viewer. Selection of one or more wagers followed by sending the wagers to the application may be performed as detailed in relation to FIG. 5.

At block 925, the one or more wagers selected may be transmitted to the television service provider system. Such a transmission may be performed by some form of wager identifier for each wager being passed by the television receiver to the television service provider system. Along with the identifiers of the one or more wagers, one or more identity identifiers may be transmitted that identify a user account of the television viewer for the sports gaming provider and/or the television receiver.

In some embodiments, the television receiver can communicate directly with the sports gaming server system; therefore the transmitted data from block 925 may be transmitted directly to the sports gaming server system. The television receiver may be required to communicate via the television service provider system. In such embodiments, the indications of the one or more selected wagers along with associated identifiers may be received by the television service provider system at block 930. At block 935, indications of the one or more selected wagers and one or more identifiers may be forwarded by the television service provider system to the sports gaming server system and received at block 940. The television service provider system can maintain a record of the one or more wagers staged by the television receiver and/or an indication of which television receiver or which account is creating staged transactions. In some embodiments, a transaction identifier may be created by the television service provider system and included with the indications of the one or more selected wagers that are forwarded to the sports gaming server system at block 935. This transaction identifier may be used to identify the correct staged set of wagers if any information is received back from sports gaming server system for these particular staged wagers.

At block 945, in response to the identifiers received at block 940, a mobile device that is linked to the television viewer's sports gaming account may be identified. For example, this could include performing a database lookup on a phone number of the mobile device. In some embodiments, rather than having to perform a database lookup, the phone number may be included as part of the information passed by the television receiver at block 925 to the sports gaming server system. In some embodiments, identifying the mobile device is not necessary; rather, identifying the television viewer's sports gaming account may be sufficient.

Method 900 continues in FIG. 9B. At block 950, a link or notification that links to the one or more staged wagers may be transmitted by the sports gaming server system to the television viewer's mobile device. The link or notification may be received by the mobile device at block 955. Regarding notifications, a request for notification may be sent by the sports gaming server system to a cellular service provider of the mobile device and the notification may be sent by the cellular service provider to the mobile device.

The television viewer may launch the sports gaming application at block 960, such as by using the link or notification of block 955. It should be expected that a very short amount of time, such as on the order of only seconds or up to a couple minutes, has elapsed since block 920 has been performed. Therefore, the television viewer will likely be viewing the sports gaming interface and/or the live television programming when the sports gaming application is launched by the television viewer. In some embodiments, rather than launching the sports gaming application, a webpage hosted by the sports gaming entity may be accessed.

In some embodiments, in order to prevent fraud, a location, using a GPS sensor of the mobile device, may be used to determine that the mobile device is within a defined distance of an address at which the television receiver is installed. The address at which the television receiver is installed can be retrieved from the television service provider system. In some embodiments, the location check may be performed by the television service provider system; in other embodiments, the location check may be performed by the gaming server system.

Alternatively to blocks 925 through 955, a machine-readable code may be output for presentation by the television receiver. Machine-readable code may have the one or more selected wagers encoded within it or may refer to an identifier transmitted by television receiver to the television service provider system and relate to the sports gaming server system that is mapped to the selected wagers. If a machine-readable code is presented, the machine-readable code may be scanned or otherwise input onto television viewer mobile device and used to retrieve the staged one or more wagers.

When the sports gaming application is launched at block 960, the one or more staged wagers may be presented on an initial screen of the sports gaming application following launch. Therefore, by launching the sports gaming application based on the received link or the received notification, the television viewer can be directed immediately to the staged wagers that were set up by the television viewer using the sports gaming interface output by the television receiver. For the staged wagers, using the sports gaming application executed by the mobile device at block 965, the television viewer can confirm that he desires to fund the staged wagers, can indicate an amount of money to be placed on each wager, can indicate a funding source for each wager, can confirm his identity, and/or otherwise can edit the wagers. As part of block 965, each staged wager transaction that the television viewer decides to complete may be transmitted and completed via communication with the sports gaming server system. At block 970, the sports gaming server system may authorize and record the completed staged wagers.

In response to block 970, at block 975, an electronic bet slip or electronic wager slip may be generated for each staged completed staged wager transaction. These electronic wager slips may be stored by the sports gaming server system and may be assigned a unique electronic wager identifier. A record of each electronic wager slip may be transmitted to and received by television viewer mobile device at block 980. Via the mobile device, the television viewer may review and examine each wager that has been completed.

Each electronic wager slip at block 975 or information present on each electronic wager slip may be transmitted to the television service provider system at block 985 or, alternatively, directly to the television receiver of the television viewer. At block 985, the television service provider system may receive the electronic wager slip information and may forward the electronic wager slip information to the television receiver at block 990. The information transmitted by the sports gaming server system to the television service provider system may include one or more identifiers that allow the television service provider system to identify the correct television receiver or account associated with the electronic wager slip information, such as the aforementioned transaction identifier.

At block 995, the television receiver may receive the information corresponding to the electronic wager slip either from the television service provider system or directly from the sports gaming server system. The television receiver may then update the sports gaming interface to include information about wagers that has been completed. Information about each wager (e.g., the monetary amount wagered, the details of the wager, the teams or players involved, the point spread, etc.) may be presented. When the wager has been won or lost by the television viewer, the sports gaming interface may be updated based on data received from the sports gaming server system indicating whether the wager was won or lost by the television viewer.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for integrating sports gaming with live television, the method comprising:
   receiving, by a television receiver, live television programming from a television service provider system;
   outputting, by the television receiver for presentation to a television, the live television programming received from the television service provider system;
   while outputting the live television programming, generating, by the television receiver, a sports gaming interface to be presented concurrently with the live television programming, wherein:
      the sports gaming interface indicates a plurality of wagering options that are each selectable by a television viewer via a remote control of the television receiver;
   receiving, by the television receiver via the remote control, a selection of a first wager from the plurality of wagering options presented in the sports gaming interface and a request to send to a mobile device of the television viewer;
   in response to the selection, transmitting, by the television receiver, a wager identifier of the first selected wager and an account identifier to the television service provider system;

transmitting, by the television service provider system, to a sports gaming server system, the wager identifier and the account identifier, wherein the sports gaming server system is distinct from the television service provider system;

in response to receiving the selected wager identifier and the account identifier, creating, by the sports gaming server system, a link to a staged wagering transaction based on the first selected wager; and transmitting, by the sports gaming server system, the link to the staged wagering transaction to the mobile device of the television viewer.

2. The method for integrating sports gaming with live television of claim 1, further comprising:
accessing, via the mobile device, the staged wagering transaction using the link; and
initiating, via the mobile device, the staged wagering transaction.

3. The method for integrating sports gaming with live television of claim 2, wherein accessing the staged wagering transaction comprises an application installed on the mobile device being launched in response to the link being accessed.

4. The method for integrating sports gaming with live television of claim 1, further comprising:
in response to initiating the staged wagering transaction, generating, by the sports gaming server system, an electronic wager slip for the staged wagering transaction.

5. The method for integrating sports gaming with live television of claim 4, further comprising:
transmitting, by the sports gaming server system to the television service provider system, information corresponding to the electronic wager slip mapped to the account identifier; and
in response to receiving the information corresponding to the electronic wager slip, transmitting, by the television service provider system to the television receiver, the information corresponding to the electronic wager slip.

6. The method for integrating sports gaming with live television of claim 5, further comprising:
presenting, by the television receiver, within the sports gaming interface, the information corresponding to the electronic wager slip, wherein the sports gaming interface indicates that the staged wagering transaction has been completed.

7. The method for integrating sports gaming with live television of claim 1, further comprising:
outputting, by the television receiver, as part of the sports gaming interface, a graphical score element corresponding to a sporting event in progress that is not being presented as the live television programming, wherein the graphical score element comprises a channel change element;
receiving, by the television receiver, a selection of the channel change element; and
while presenting the sports gaming interface, changing a television channel to output live television programming corresponding to the sporting event in response to the selection of the channel change element.

8. The method for integrating sports gaming with live television of claim 1, wherein the live television programming is transmitted to the television receiver by the television service provider via a satellite and the wager identifier is transmitted to the television service provider via the Internet.

9. The method for integrating sports gaming with live television of claim 1, further comprising:
receiving, by the television receiver via the remote control, a selection of a second wager of the plurality of wagering options presented in the sports gaming interface, wherein the request to send to the mobile device of the television viewer occurs while both the first selected wager and the second selected wager are selected.

10. A system for integrating sports gaming with live television, the system comprising:
a television receiver, comprising:
one or more tuners;
one or more processors; and
a remote control, wherein the television receiver is configured to:
receive live television programming from a television service provider system;
output, to a television, the live television programming received from the television service provider system;
while outputting the live television programming, generate a sports gaming interface to be presented concurrently with the live television programming, wherein:
the sports gaming interface indicates a plurality of wagering options that are each selectable by a television viewer via the remote control of the television receiver;
receive, via the remote control, a selection of a first wagering option of the plurality of wagering options presented in the sports gaming interface and a request to send to a mobile device of the television viewer; and
in response to the selection, transmit a wager identifier of the selected first wagering option and an account identifier to the television service provider system; and
the television service provider system, configured to:
transmit the live television programming to a plurality of television receivers that includes the television receiver;
receive the wager identifier from the television receiver; and
transmit, to a sports gaming server system, the wager identifier and the account identifier, wherein the sports gaming server system is distinct from the television service provider system, wherein:
the sports gaming server system, in response to receiving the wager identifier and the account identifier, creates a link to a staged wagering transaction based on the first wagering option; and
the sports gaming server system transmits the link to the staged wagering transaction to the mobile device of the television viewer.

11. The system for integrating sports gaming with live television of claim 10, the system further comprising:
the mobile device, comprising:
one or more processors;
a wireless network interface; and
a touchscreen, wherein the mobile device is configured to:
access the staged wagering transaction using the link; and
initiate the staged wagering transaction.

12. The system for integrating sports gaming with live television of claim 11, wherein the mobile device accesses the staged wagering transaction via an application installed on the mobile device being launched in response to the link being accessed.

13. The system for integrating sports gaming with live television of claim 10, wherein the sports gaming server system is further configured to generate an electronic wager slip for the staged wagering transaction in response to initiating the staged wagering transaction.

14. The system for integrating sports gaming with live television of claim 13, wherein:
the sports gaming server system is further configured to transmit, to the television service provider system, information corresponding to the electronic wager slip mapped to the account identifier; and
the television service provider system is further configured to transmit, to the television receiver, the information corresponding to the electronic wager slip in response to receiving the information corresponding to the electronic wager slip.

15. The system for integrating sports gaming with live television of claim 14, wherein the television receiver is further configured to:
output for presentation within the sports gaming interface the information corresponding to the electronic wager slip, wherein the sports gaming interface indicates that the staged wagering transaction has been completed.

16. The system for integrating sports gaming with live television of claim 10, wherein the television receiver is further configured to:
output, for presentation as part of the sports gaming interface, a graphical score element corresponding to a sporting event in progress that is not being presented as the live television programming, wherein the graphical score element comprises a channel change element;
receive a selection of the channel change element; and
while presenting the sports gaming interface, change a television channel to output live television programming corresponding to the sporting event in response to the selection of the channel change element.

17. The system for integrating sports gaming with live television of claim 10, wherein the live television programming is transmitted to the television receiver by the television service provider via a satellite and the wager identifier is transmitted to the television service provider via the Internet or the satellite.

18. The system for integrating sports gaming with live television of claim 10, wherein the television receiver is further configured to:
receive, via the remote control, a selection of a second wagering option of the plurality of wagering options presented in the sports gaming interface, wherein the request to send to the mobile device of the television viewer occurs while both the first wagering option and the second wagering option are selected.

\* \* \* \* \*